United States Patent [19]
Oldenziel et al.

[11] Patent Number: 5,533,408
[45] Date of Patent: Jul. 9, 1996

[54] CLAMP-ON ULTRASONIC VOLUMETRIC FLOWMETER

[75] Inventors: Daniel Oldenziel, La-Chaux-de-Fonds, Switzerland; Marcel Griessmann, Mulhouse, France

[73] Assignee: Endress + Hauser Flowtec AG, Switzerland

[21] Appl. No.: 361,941

[22] Filed: Dec. 22, 1994

[30] Foreign Application Priority Data

Dec. 23, 1993 [EP] European Pat. Off. ............ 93810901

[51] Int. Cl.$^6$ .................................................. G01F 1/00
[52] U.S. Cl. ..................... 73/861.18; 73/861.27; 73/861.06
[58] Field of Search .................. 73/861, 861.06, 73/861.18, 861.27, 861.28, 861.29, 861.31

[56] References Cited

U.S. PATENT DOCUMENTS

| | | | |
|---|---|---|---|
| 4,484,478 | 11/1984 | Härkönen . | |
| 4,507,974 | 4/1985 | Yelderman | 73/861.06 |
| 4,598,593 | 7/1986 | Sheen et al. . | |
| 4,726,235 | 2/1988 | Leffert et al. | 73/861.04 |
| 4,841,780 | 6/1989 | Inada et al. | 73/861.06 |
| 4,882,934 | 11/1989 | Leffert et al. | 73/861.04 |
| 5,029,481 | 7/1991 | Keech | 73/861.06 |
| 5,052,230 | 10/1991 | Lang et al. . | |

FOREIGN PATENT DOCUMENTS

| | | |
|---|---|---|
| 0446023A1 | 9/1991 | European Pat. Off. . |
| WO88/08516 | 11/1988 | WIPO . |

Primary Examiner—Richard Chilcot
Assistant Examiner—Ronald Biegel
Attorney, Agent, or Firm—Barnes & Thornburg

[57] ABSTRACT

To permit this flowmeter to automatically operate either on one measurement principle or on another depending on a selectable foreign-particle content of the fluid, it has a first pair of ultrasonic transducers, one of which is operated as a transmitting transducer and the other as a receiving transducer or vice versa, and which are mounted on the outside surface of a fluid-carrying pipe and separated by a given distance in a direction parallel to the axis of the pipe, with the angle between the direction of the ultrasound and the pipe axis differing from 90°. There is provided a second pair of ultrasonic transducers which are operated simultaneously as transmitting transducers or receiving transducers and are mounted on the outside surface of the pipe and separated by a given distance in a direction parallel to the axis of the pipe, the angle between the direction of the ultrasound and the pipe axis being less than or equal to 90°. Driver/evaluation electronics either supply the ultrasonic transducers of the first pair successively with a pulse burst, measure the travel time in the downstream and upstream directions of the ultrasonic signals propagating through the fluid and reflected at the opposite inside surface of the pipe, and determine volumetric flow rate therefrom, or supply the ultrasonic transducers of the second pair with the pulse burst simultaneously, measure the time difference between signals reflected at foreign particles in the fluid and received by those ultrasonic transducers using correlation techniques, and determine volumetric flow rate therefrom. Changeover electronics with a threshold switch switch the driver/evaluation electronics to the travel-time or correlation mode in response to the output of the threshold switch.

6 Claims, 3 Drawing Sheets

CLAMP-ON ULTRASONIC VOLUMETRIC FLOWMETER

FIELD OF THE INVENTION

The present invention relates to clamp-on ultrasonic volumentric flowmeters comprising at least one pair of ultrasonic transducers one of which is operated as a transmitter and the other as a receiver or vice versa, and which are disposed on the outside surface of a pipe carrying the fluid to be measured and are separated by a given distance in a direction parallel to the axis of the pipe.

BACKGROUND OF THE INVENTION

Applicant's U.S. Pat. No. 5,052,230 discloses an ultrasonic volumetric flowmeter comprising two ultrasonic transducers operated as transmitter or receiver which are disposed oppositely to each other along a pipe carrying the fluid to be measured and are separated by a given distance in the direction of the axis of the pipe, and driver/evaluation electronics which
feed the two ultrasonic transducers successively with a sine-wave burst, measure the travel times of ultrasonic signals propagating from one ultrasonic transducer through the fluid to the other ultrasonic transducer in the downstream and upstream directions, and determine volumetric flow rate therefrom.

WO-A-88/08516 discloses a clamp-on ultrasonic volumetric flowmeter comprising two ultrasonic transducers operated as transmitter or receiver which are disposed oppositely to each other along a pipe carrying the fluid to be measured and are separated by a given distance in the direction of the axis of the pipe, a first additional transducer, a second additional transducer, driver/evaluation electronics which
feed the two ultrasonic transducers successively with a sine-wave burst, measure the travel times of ultrasonic signals propagating from one ultrasonic transducer through the fluid to the other ultrasonic transducer in the downstream and upstream directions, and determine volumetric flow rate therefrom, and additional electronics
which measure, in a direction perpendicular to the axis of the pipe, the orthogonal travel time of the ultrasonic signal in the wall of the pipe by means of the first additional transducer and the orthogonal travel time of the ultrasonic signal propagating through the fluid and reflected at the inside surface of the pipe opposite the second additional transducer by means of this second additional transducer.

U.S. Pat. No. 4,484,478, U.S. Pat. No. 4,598,593, and EP-A-446 023 each disclose a clamp-on ultrasonic volumetric flowmeter comprising at least two ultrasonic transducers operated as transmitter or receiver which are disposed on the outside surface of a pipe carrying the fluid to be measured and are separated by a given distance in a direction parallel to the axis of the pipe, and driver/evaluation electronics
which supply the at least two ultrasonic transducers simultaneously with a pulse burst and, using correlation techniques, measure the time difference between signals reflected at foreign particles in the fluid and received in the intervals between the pulse bursts by the at least two ultrasonic transducers, and determine volumetric flow rate therefrom.

The ultrasonic volumetric flowmeter disclosed in the above-mentioned U.S. Pat. No. 5,052,230 and the clamp-on ultrasonic volumetric flowmeter disclosed in the above-mentioned WO-A-88/08516 are intended only for fluids containing no foreign particles, and become inoperative when the foreign-particle content increases, since the ultrasound is scattered and/or absorbed in the fluid so strongly that it does not reach the receiver in sufficient strength.

The clamp-on ultrasonic volumetric flowmeters disclosed in the above U.S. Pat. No. 4,484,478, U.S. Pat. No. 4,598, 593, and EP-A-446 023 are intended only for fluids containing foreign particles, but will fail if foreign-particle-free fluids are to be measured.

In practice, however, it cannot be ruled out that fluids which should be free from foreign particles contain foreign particles after all, which then interfere with or even prevent the measurement, and that fluids supposed to contain foreign particles are, by way of exception, free from foreign particles, which also interferes or even prevents the measurement.

SUMMARY OF THE INVENTION

It is, therefore, an object of the invention to combine the two aforementioned, separately described measurement principles in one clamp-on ultrasonic volumetric flowmeter so that the flowmeter will automatically operate either on one of the principles or on the other depending on a user-selectable foreign-particle content of the fluid.

Accordingly, the invention consists in the provision of a clamp-on ultrasonic volumetric flowmeter comprising a first pair of ultrasonic transducers
one of which is operated as a transmitting transducer and the other as a receiving transducer or vice versa, or
which are both operated as transmitting transducers and subsequently as receiving transducers for short times, and
which are disposed on the outside surface of a pipe carrying the fluid to be measured and are separated by a given distance in a direction parallel to the axis of the pipe, such that the angle between the direction of the ultrasound generated by them and the axis of the pipe is different from 90°;

a second pair of ultrasonic transducers which are operated simultaneously as transmitting transducers or receiving transducers, and which are disposed on the outside surface of the pipe and are separated by a given distance in a direction parallel to the axis of the pipe, such that the angle between the direction of the ultrasound generated by them and the axis of the pipe is less than or equal to 90°; and driver/evaluation electronics
which supply one or both ultrasonic transducers of the first pair with a pulse burst, measure the travel times of ultrasonic signals propagating between said ultrasonic transducers through the fluid in the downstream and upstream directions and reflected at the inside surface of the pipe opposite said ultrasonic transducers, and determine volumetric flow rate therefrom (=travel-time electronics), or
which supply the ultrasonic transducers of the second pair simultaneously with the pulse burst and, using correlation techniques, measure the time difference between signals reflected at foreign particles in the fluid and received in the intervals between the pulse bursts by said ultrasonic transducers, and determine volumetric flow rate therefrom (=correlation electronics), and which include threshold changeover electronics with a threshold switch which switch the driver/evaluation electronics to the travel-time mode or the correlation mode in response to the output of the threshold switch, said threshold switch being supplied with an adjustable threshold signal and a variation signal which is formed from a signal that was provided by one of the ultrasonic transducers of the first pair in the receive mode and then integrated.

In a preferred embodiment of the invention, one ultrasonic transducer of the first pair and one ultrasonic transducer of the second pair as well as the respective other transducers of the first and second pairs are united to form a pair of compound ultrasonic transducers.

In another preferred embodiment of the invention, there are provided an additional ultrasonic transducer and additional electronics which measure, in a direction perpendicular to the axis of the pipe, the orthogonal travel time of the ultrasonic signal in the wall of the pipe and the orthogonal travel time of the ultrasonic signal propagating through the fluid and reflected at the inside surface of the pipe opposite the additional ultrasonic transducer, which are supplied with a circumference signal proportional to the outer circumference of the pipe and with a sound-velocity signal proportional to the velocity of sound in the material of the pipe, and which determine the wall thickness of the pipe and the velocity of sound in the fluid from the two orthogonal travel times, the circumference signal, and the sound-velocity signal.

According to further advantageous aspects of the invention, the variation signal is the output signal of a root-mean-square stage or the output signal of a rectifier or the output signal of a peak-to-peak detector.

BRIEF DESCRIPTION OF THE DRAWINGS

The invention will now be explained in more detail with reference to the accompanying drawings, which are schematic representations of the mechanical portion and block diagrams of circuits for implementing the principle underlying the invention, and in which like parts are designated by like reference characters.

DETAILED DESCRIPTION OF THE PREFERRED EMBODIMENT

Figure 1:
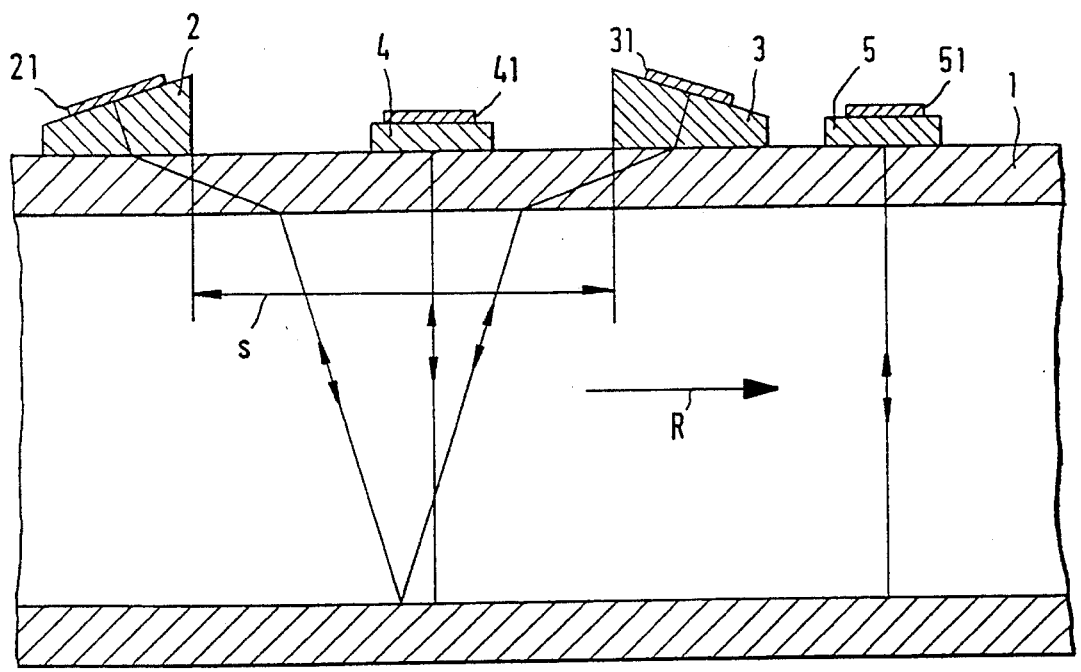
FIG. 1 is a schematic sectional view of the mechanical portion of a clamp-on ultrasonic volumetric flowmeter.

Referring to FIG. 1, which is a highly schematic sectional view of the mechanical portion of a clamp-on ultrasonic volumetric flowmeter, a first pair of ultrasonic transducers 2, 3 is disposed on the outside surface of a pipe 1 through which the fluid to be measured is flowing in the direction of arrow R. The ultrasonic transducers 2, 3 are separated by a given distance in a direction parallel to the axis of the pipe.

This pair of ultrasonic transducers can be operated in two ways. Firstly, the two ultrasonic transducers can be operated alternately as a transmitting transducer and a receiving transducer, so that either the ultrasonic transducer 2 acts as the transmitting transducer and the ultrasonic transducer 3 as the receiving transducer, or the ultrasonic transducer 3 acts as the transmitting transducer and the ultrasonic transducer 2 as the receiving transducer. Thus, measurements are performed successively in the direction of fluid flow and in the opposite direction. Secondly, both ultrasonic transducers 2, 3 can be operated as transmitting transducers and subsequently as receiving transducers for short times, so that measurements are performed simultaneously in the direction of fluid flow and in the opposite direction.

A second pair of ultrasonic transducers 4, 5, each of which is operated simultaneously as a transmitting transducer or a receiving transducer, are also disposed on the outside wall of the pipe so as to be separated by a given distance in a direction parallel to the axis of the pipe, but the angle between the direction of the ultrasound generated by them and the axis of the pipe is 90°.

In the case of the first pair of ultrasonic transducers 2, 3, this angle is different from 90° since the transducers are wedge-shaped, with the apertures of the respective wedge angles facing toward each other. The wedge-shaped structure is achieved by providing a wedge of sound-conducting material between the pipe 1 and the respective ultrasonic generator 21, 31.

Although the aforementioned 90° angle of the ultransonic transducers 4, 5 of the second pair represents the currently best mode of implementation, applications cannot be excluded in which this angle should be less than 90°. In that case, the ultrasonic transducers 4, 5 of the second pair will have a wedge-shaped structure comparable to that of the first pair.

As indicated in FIG. 1 by the ultrasonic beam shown, the wedge shape of the ultrasonic transducers 2, 3 results in the ultrasound emitted by the ultrasonic transducer 2, for example, being incident on the inside surface of the pipe opposite the ultrasonic transducers 2, 3 at an angle different from 90°, and being reflected there to the ultrasonic transducer 3. The distance s between the ultrasonic transducers 2, 3 is chosen so that the ultrasound reflected at the inside surface of the pipe 1 reaches the receiving ultrasonic transducer as completely as possible.

In the case of the ultrasonic transducers 4, 5 of the second pair, the aforementioned angle of 90° is obtained by providing no wedge between the respective ultrasonic generator 41, 51 and the outside surface of the pipe 1. As a result, the ultrasound propagates through the fluid in a direction virtually perpendicular and orthogonal to the direction of the axis of the pipe 1, and is reflected to the transmitting transducer at the opposite inside surface of the pipe.

Figure 2:
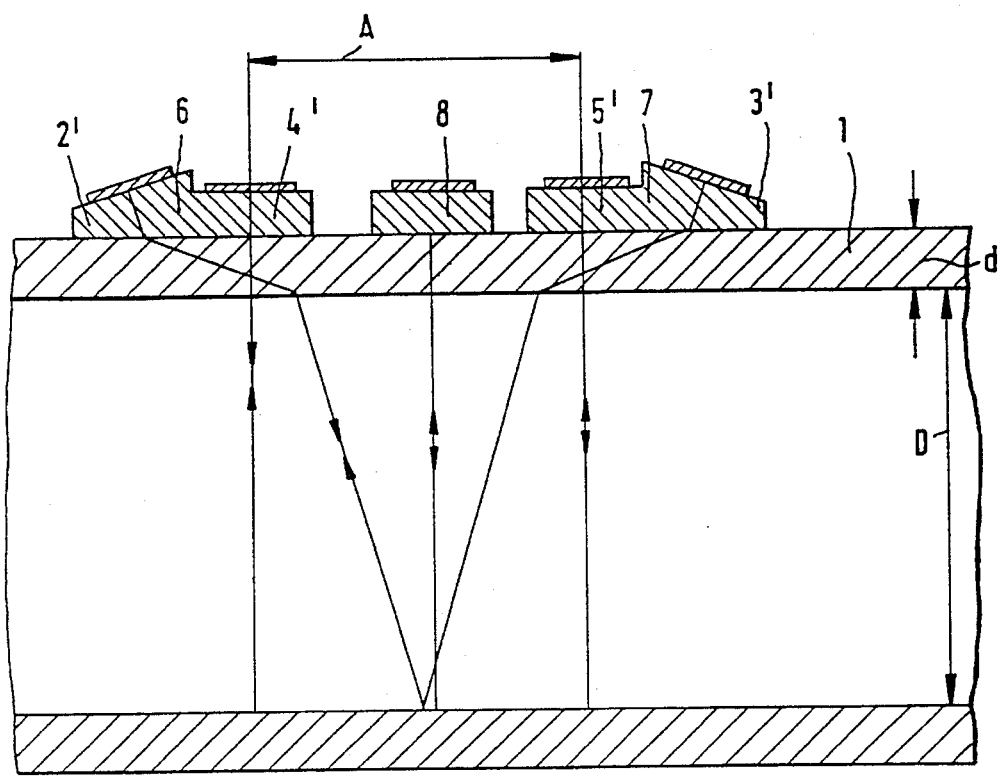
FIG. 2 is a schematic sectional view of the mechanical portion of a further development of the clamp-on ultrasonic volumetric flowmeter of FIG. 1.

FIG. 2 shows a further development of the assembly of FIG. 1 in a similar graphical representation as in FIG. 1. One ultrasonic transducer of the first pair and one ultrasonic transducer of the second pair, namely the transducers 2, 4, and the other transducers of the two pairs, namely the transducers 3, 5, have been combined into a pair of compound ultrasonic transducers 6, 7, the compound ultrasonic transducer 6 containing the wedge-shaped transducer 2' and the non-wedge-shaped transducer 4', and the compound ultrasonic transducer 7 containing the wedge-shaped transducer 3' and the non-wedge-shaped transducer 5'.

FIG. 2 further shows an additional, non-wedge-shaped ultrasonic transducer 8, which is mounted on the outside surface of the pipe like the other ultrasonic transducers, and whose ultrasound propagates through the fluid in a direction virtually perpendicular to the direction of the axis of the pipe 1 and is reflected to this transducer at the opposite inside surface of the pipe.

Also indicated in FIG. 2 are important distances, namely the wall thickness d of the pipe 1, the inside diameter D of the pipe, and the center-to-center distance between the ultrasonic transducers 4', 5' which also determines the distance between the ultrasonic transducers 2', 3'.

Figure 3:
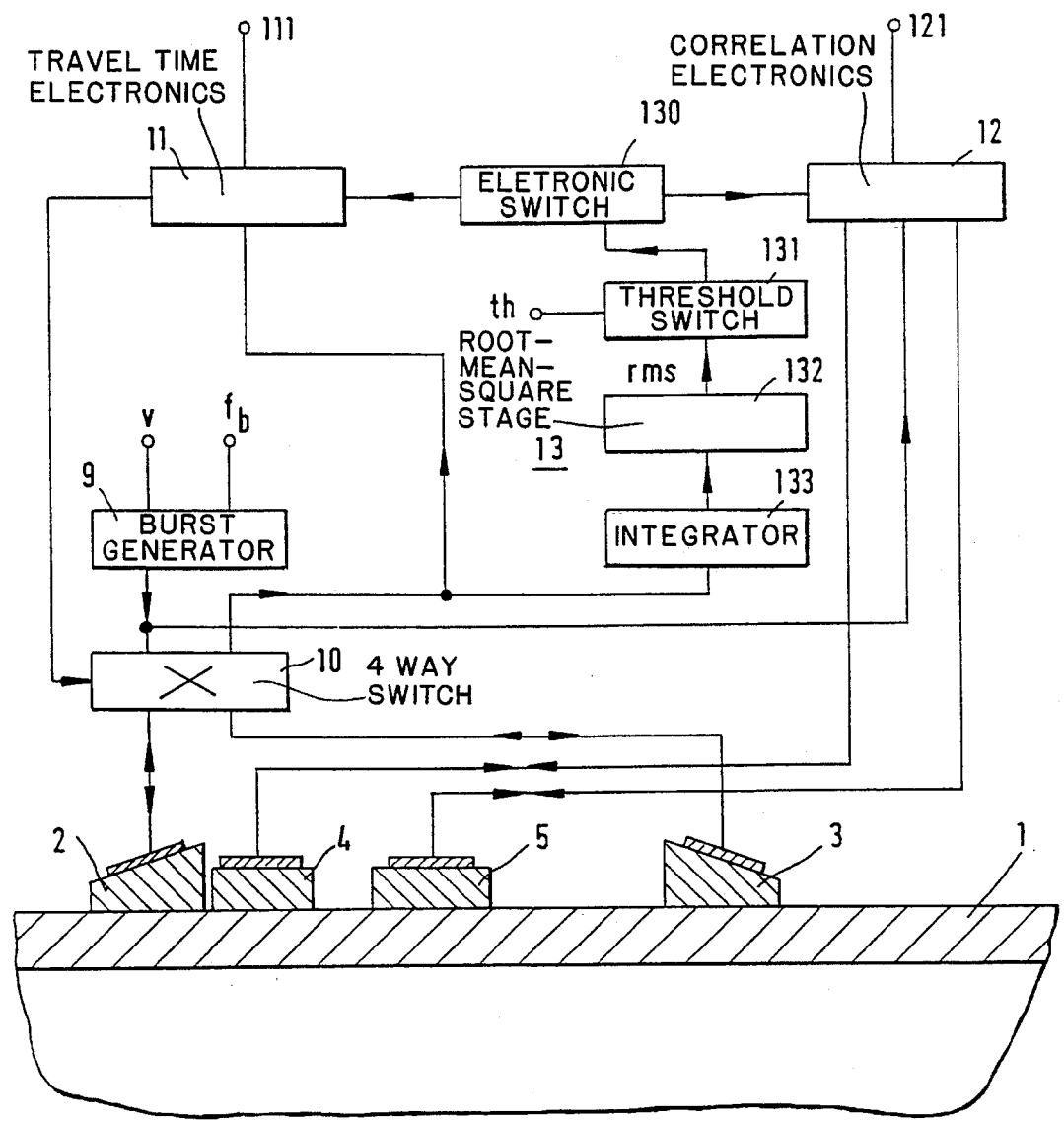
FIG. 3 shows a part of the assembly of FIG. 1 together with a detailed block diagram of a circuit for operating the clamp-on ultrasonic volumetric flowmeter of the invention.

FIG. 3 shows the mechanical portion of the assembly of FIG. 1 together with a block diagram representing essentially the functional blocks of driver/evaluation electronics. A burst generator 9 generates pulse bursts, i.e., a selectable number n (n ≧ 1) of high-frequency pulses within the pulses of a virtual square-wave envelope with a predeterminable mark-space ratio v. The high-frequency pulses have a frequency $f_b$, on the order of 1 MHZ, for example, while the pulses of the square-wave envelope have a duration of 10 μs, for example, so that n=10 1-MHz pulses will fit into each of these pulses. The adjustability of the burst generator 9 with respect to its mark-space ratio v and the frequency $f_b$ is symbolized by correspondingly denoted inputs at the burst generator 9.

The output of the burst generator 9 is applied to a four-way switch 10, which, as described in the above-mentioned U.S. Pat. No. 5,052,230, causes the ultrasonic transducers 2, 3 to operate alternately as transmitting and receiving transducers. The 4-way changeover is controlled by travel-time electronics 11 as are also described in that U.S. Pat. No. 5,052,230.

In this mode of operation, the travel-time electronics 11 supply the ultrasonic transducers 2 and 3 of the first pair successively with a pulse burst, measure the travel times of ultrasonic signals propagating between the ultrasonic transducers 2 and 3 through the fluid in the downstream direction and between the ultrasonic transducers 3 and 2 in the upstream direction and reflected at the inside surface of the pipe 1 opposite the ultrasonic transducers 2, 3, and determine volumetric flow rate therefrom.

In the above-mentioned other mode, the travel-time electronics 11 supply both ultrasonic transducers 2, 3 with the pulse burst for a short time, so that these transducers are simultaneously transmitting transducers. Subsequently, when the ultrasonic transducers 2, 3 are receiving transducers, the travel-time electronics 11 measure the travel times of ultrasonic signals propagating between the ultrasonic transducers 2 and 3 through the fluid in the downstream direction and between the ultrasonic transducers 3 and 2 in the upstream direction and reflected at the inside surface of the pipe 1 opposite the ultrasonic transducers 2, 3, and determines volumetric flow rate therefrom.

Thus, in both modes, the travel-time electronics 11 provide, at their output 111, a signal representative of volumetric flow rate, e.g., an indication on a display and/or a suitable electric signal, such as a current signal of 4 mA to 20 mA assigned to the respective measuring range.

The threshold changeover electronics 13 of FIG. 3 include an electronic switch 130, whose control input is connected to the output of a threshold switch 131. The latter is supplied with a user-adjustable threshold signal th, which determines its switching threshold, and a variation signal rms. This signal is formed in a root-mean-square stage 132 from a signal provided by one of the ultrasonic transducers 2, 3 of the first pair in the receive mode, after the latter signal has been integrated in an integrator 133, e.g., a sample-and-hold stage, whose input is connected to one of the outputs of the four-way switch 10.

Instead of the root-mean-square stage 132, a rectifier or a peak-to-peak detector can be used to derive the variation signal.

One input of correlation electronics 12 is connected to the output of the burst generator 9, so that the ultrasonic transducers 4, 5 of the second pair are supplied simultaneously with the pulse burst. The correlation electronics 12 measure the time difference between signals reflected at foreign particles in the fluid and received in the intervals between the pulse bursts by the ultrasonic transducers 4, 5 of the second pair using correlation techniques, particularly cross-correlation, as is described in the above-mentioned U.S. Pat. No. 4,484,478, and determines volumetric flow rate therefrom.

With the threshold signal th, the user can preset or select that foreign particle content of the fluid at which changeover from the travel-time measurement to the correlation measurement is to take place.

The correlation electronics 12 thus provide at their output 121—just as the travel-time electronics 11 at the output 111—a signal representative of volumetric flow rate, e.g., an indication on a display and/or a suitable electric signal, such as a current signal of 4 mA to 20 mA assigned to the respective measuring range.

The electronic switch 130 of the threshold changeover electronics 13 turns on either the travel-time electronics 11 or the correlation electronics 12, thus placing the driver/evaluation electronics either in the travel-time mode or in the correlation mode.

Figure 4:
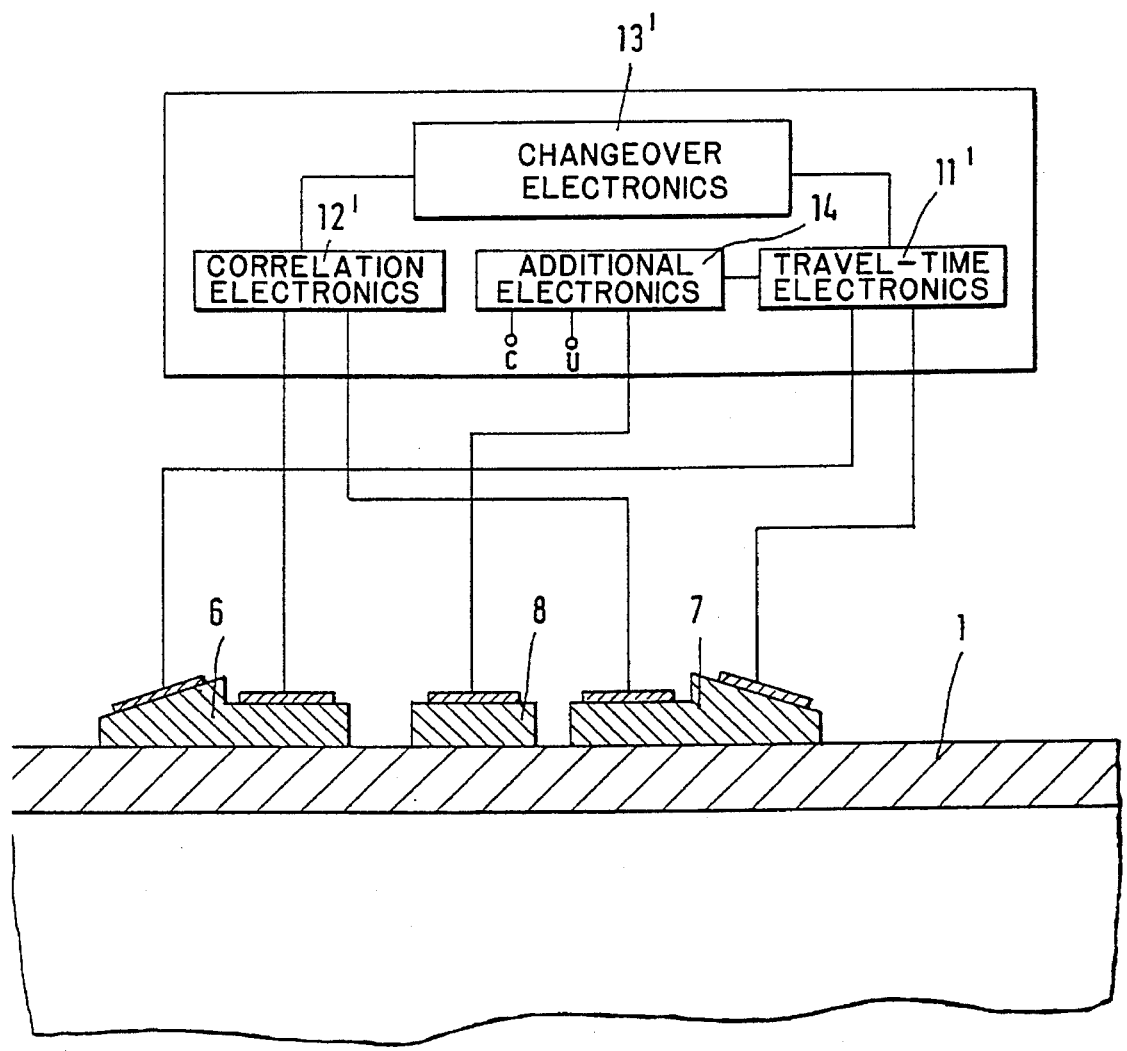
FIG. 4 shows a part of the assembly of FIG. 2 together with a block diagram of an operating circuit reduced to the essential functional blocks.

FIG. 4 shows a part of the assembly of FIG. 2 together with a block diagram of driver/evaluation electronics, which has been reduced to the essential functional blocks. The block diagram contains travel-time electronics 11', correlation electronics 12', threshold changeover electronics 13', and additional electronics 14. The travel-time electronics 11' include the burst generator 9 and the four-way switch of FIG. 3 to simplify the illustration.

The additional electronics 14 serve to determine the sound velocity in the fluid, the inside diameter D, and the wall thickness d of a real pipe 1 if the pipe has already been installed in a closed system, for example, so that the two latter quantities can no longer be measured without opening the pipe.

This determination can be made with the additional clamp-on ultrasonic transducer 8 which, in response to pulse bursts applied to it, transmits ultrasonic signals in a direction perpendicular to the axis of the pipe 1, and receives reflected signals in the transmission intervals, namely reflected signals which occur both at the inside pipe surface directly below the transducer and at the opposite inside surface, which is separated by the fluid. Instead of the additional ultrasonic transducer 8, one of the ultrasonic transducers of the second pair can be used in conjunction with the additional electronics.

The additional electronics 14 thus measure the orthogonal travel time of the ultrasonic signal in the wall of the pipe and the orthogonal travel time of the ultrasonic signal propagating through the fluid and reflected at the inside surface of the pipe opposite the additional ultrasonic transducer 8.

Since the material of the real pipe and, thus, the sound velocity of this material are known, and the outer circumference of the real pipe can be measured in situ, signals proportional to these quantities, i.e., a sound-velocity signal c and a circumference signal u, can be applied at corresponding inputs of the additional electronics 14.

The additional electronics 14 determine the wall thickness d of the pipe 1 from the two orthogonal travel times, the sound-velocity signal c, and the circumference signal u, and present the thickness value on a display, for example. This value is then taken into account in selecting the distance s when clamping on the ultrasonic transducer 2, 3 of the first pair. Also presented on the display is the sound velocity in the fluid.

Clamp-on ultrasonic volumetric flowmeters according to the invention are suitable for measurements at Reynolds numbers greater than 10,000, particularly on pipes with nominal bores greater than 200 mm.

We claim:

1. A clamp-on ultrasonic volumetric flowmeter comprising a first pair of ultrasonic transducers
transducers operate alternately both as transmitting transducers and receiving transducers, and
disposed on the outside surface of a pipe carrying a fluid to be measured and separated by a given distance in a direction parallel to the axis of the pipe, such that the angle between the direction of the ultrasound generated by them and the axis of the pipe is different from 90°;

a second pair of ultrasonic transducers which are operated simultaneously as transmitting transducers or receiving transducers, and which are disposed on the outside surface of the pipe and are separated by a given distance in a direction parallel to the axis of the pipe, such that the angle between the direction of the ultrasound generated by them and the axis of the pipe is substantially equal to 90°; and driver/evaluation electronics
which supply both ultrasonic transducers of the first pair with a pulse burst, measure the travel times of ultrasonic signals propagating between said ultrasonic transducers through the fluid in the downstream and upstream directions and reflected at the inside surface of the pipe opposite said ultrasonic transducers, and determine volumetric flow rate therefrom (=travel-time electronics), or
which supply the ultrasonic transducers of the second pair simultaneously with the pulse burst and, using correlation techniques, measure the time difference between signals reflected at foreign particles in the fluid and received in the intervals between the pulse burst by said ultrasonic transducers, and determine volumetric flow rate therefrom (=correlation electronics), and
which include threshold changeover electronics with a threshold switch
which switch the driver/evaluation electronics to the travel-time mode or the correlation mode in response to the output of the threshold switch,
said threshold switch being supplied with an adjustable threshold signal and a variation signal which is formed from a signal that was provided by one of the ultrasonic transducers of the first pair in the receive mode and then integrated.

2. A clamp-on ultrasonic volumetric flowmeter as claimed in claim 1 wherein one ultrasonic transducer of the first pair and one ultrasonic transducer of the second pair as well as the respective other transducers of the first and second pairs are united to form a pair of compound ultrasonic transducers.

3. A clamp-on ultrasonic volumetric flowmeter as claimed in claim 1, comprising an additional ultrasonic transducer and additional electronics
which measure, in a direction perpendicular to the axis of the pipe, the orthogonal travel time of the ultrasonic signal in the wall of the pipe and the orthogonal travel time of the ultrasonic signal propagating through the fluid and reflected at the inside surface of the pipe opposite the additional ultrasonic transducer,
which are supplied with a circumference signal proportional to the outer circumference of the pipe and with a sound-velocity signal proportional to the velocity of sound in the material of the pipe, and
which determine the wall thickness of the pipe and the velocity of sound in the fluid from the two orthogonal travel times, the circumference signal, and the sound-velocity signal.

4. A clamp-on ultrasonic volumetric flowmeter as claimed in claim 1 wherein the variation signal is the output signal of a root-mean-square stage.

5. A clamp-on ultrasonic volumetric flowmeter as claimed in claim 1 wherein the variation signal is the output signal of a rectifier.

6. A clamp-on ultrasonic volumetric flowmeter as claimed in claim 1 wherein the variation signal is the output signal of a peak-to-peak detector.

* * * * *